US012229803B2

(12) United States Patent
Yates (10) Patent No.: US 12,229,803 B2
(45) Date of Patent: Feb. 18, 2025

(54) UNIFIED PRESENTATION OF CROSS-PLATFORM CONTENT TO A USER VISITING A PLATFORM

(71) Applicant: Promoted.ai, Inc., San Francisco, CA (US)

(72) Inventor: Andrew Donald Yates, San Francisco, CA (US)

(73) Assignee: Promoted.ai, Inc., San Francisco, CA (US)

( * ) Notice: Subject to any disclaimer, the term of this patent is extended or adjusted under 35 U.S.C. 154(b) by 0 days.

(21) Appl. No.: 18/119,818

(22) Filed: Mar. 9, 2023

(65) Prior Publication Data

US 2023/0289848 A1 Sep. 14, 2023

Related U.S. Application Data

(60) Provisional application No. 63/318,045, filed on Mar. 9, 2022.

(51) Int. Cl.
*G06Q 30/0251* (2023.01)
(52) U.S. Cl.
CPC ..... *G06Q 30/0271* (2013.01); *G06Q 30/0256* (2013.01)
(58) Field of Classification Search
None
See application file for complete search history.

(56) References Cited

U.S. PATENT DOCUMENTS

| 9,699,265 | B2* | 7/2017 | Sahota | H04L 67/51 |
| 11,210,746 | B1* | 12/2021 | Zhao | H04L 67/535 |
| 11,388,467 | B1* | 7/2022 | Schweinfurth | H04N 21/472 |
| 2013/0318193 | A1* | 11/2013 | Koli | G06Q 30/0277 |
| | | | | 709/213 |
| 2014/0279045 | A1* | 9/2014 | Shottan | G06Q 30/0269 |
| | | | | 705/14.66 |
| 2014/0335497 | A1* | 11/2014 | Gal | G09B 7/00 |
| | | | | 434/323 |
| 2015/0142741 | A1* | 5/2015 | Jia | G06F 16/148 |
| | | | | 707/634 |
| 2015/0142865 | A1* | 5/2015 | Shimizu | G06F 11/30 |
| | | | | 709/201 |
| 2018/0012250 | A1* | 1/2018 | Malca | G06Q 30/0277 |
| 2018/0315061 | A1* | 11/2018 | Brown | H04L 67/535 |
| 2019/0220873 | A1* | 7/2019 | Sullivan | G06Q 30/0201 |

(Continued)

Primary Examiner — Allan J Woodworth, II
(74) Attorney, Agent, or Firm — Cognition IP, P.C.; Edward Steakley (57) ABSTRACT

Methods and systems provide for a unified presentation of cross-platform content to a user visiting a platform. In one embodiment, the system connects a client device associated with a user to a first content platform; receives a request from the client device to present content to the user at the first content platform; receives content associated with one or more additional content platforms; determines a subset of the content to present to the user; standardizes the subset of the content in a format to be used at the first content platform; presents the subset of the content to the user at the first content platform; processes a set of unified cross-platform metrics for user events related to the user interacting with the subset of the content at the first content platform; and provides a report of the set of unified cross-platform metrics for the user events.

22 Claims, 8 Drawing Sheets

(56) References Cited

U.S. PATENT DOCUMENTS

| | | | | |
|---|---|---|---|---|
| 2020/0160373 A1* | 5/2020 | Thimmaiah | ......... | G06Q 30/0246 |
| 2021/0357952 A1* | 11/2021 | Liu | ....................... | G06Q 10/107 |
| 2022/0198486 A1* | 6/2022 | Gin | ........................ | G06N 3/006 |
| 2022/0272420 A1* | 8/2022 | Tucker | ............. | H04N 21/64738 |
| 2022/0408155 A1* | 12/2022 | Foyle | ................... | H04N 21/251 |
| 2023/0177172 A1* | 6/2023 | Seth | ....................... | G06Q 30/02 |
| | | | | 713/189 |
| 2023/0216739 A1* | 7/2023 | Leng | .................. | H04L 41/0866 |
| | | | | 709/224 |
| 2023/0300395 A1* | 9/2023 | Karoui | ............... | H04N 21/4316 |
| | | | | 725/34 |

\* cited by examiner

UNIFIED PRESENTATION OF CROSS-PLATFORM CONTENT TO A USER VISITING A PLATFORM

FIELD OF INVENTION

The present invention relates generally to content optimization for digital platforms, and more particularly, to systems and methods for providing a unified presentation of cross-platform content to a user visiting a platform.

BACKGROUND

When creating advertising or promotional campaigns, an entity or organization may decide to perform cross-listing of products or create promotional campaign where the content is a product, service, or piece of media with promotional intent. Some media item or other content is created within a content platform during this process. In some situations, such as when an organization uses an advertising exchange to create promotional content, content can be created dynamically. In some other situations, an Application Programming Interface (hereinafter "API") is used. In the case of cross-listing of products, a variety of different startups or service may offer a listing of products or services they sell. The entity must create content through an endpoint on the content platform.

One issue with this, however, is that the entity must create the media or content item in advance. Additionally, for the purposes of measurement, recording, and analysis, the entity may not be aware of, for example, whether a sale happened in a particular moment, whether a user saw the content item, or how the user behaved upon seeing the content item. Such metrics are siloed in the content platform that is displaying the item and are not always available to entities creating the content and selling the products on those platforms, or if they are available, they can be accessed through an API to retrieve the metrics. Accessing metrics through an API, as well as creating content via a different API, can be time-intensive and cumbersome.

Thus, there is a need for a more integrated framework within that content platform which allows the entity to have their content and their services wrapped into the content platform in a standardized way to allow for cross-platform content presentation to users. For example, when a publisher, i.e. a content platform, calls its own services to determine what it is allowed to show, it can call other content services to receive candidate content items. Thus, content items from various entities can be retrieved natively via search and retrieval systems for other platforms. This can be enabled because there is a consistent wrapper around each of the search and retrieval systems of the various content platforms.

BRIEF DESCRIPTION OF THE DRAWINGS

The present invention relates generally to content optimization for digital platforms, and more particularly, to systems and methods for providing a unified presentation of cross-platform content to a user visiting a platform.

The present disclosure will become better understood from the detailed description and the drawings, wherein.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Disclosed herein is a system and method to enable a user visiting a first platform to interact with relevant content from one or more additional platforms without the user leaving the first platform. The system selects the content to present to the user based on the user's interactions with the additional platform(s) and the user's interaction with those platforms' content presented on the first platform.

In one embodiment, the system connects a client device associated with a user to a first content platform from a set of content platforms; receives a request from the client device to present content to the user at the first content platform; receives content associated with one or more of: the first content platform, and one or more additional content platforms from the set of content platforms; determines a subset of the content to present to the user; standardizes the subset of the content associated with the one or more additional content platforms in a format to be used at the first content platform; presents the subset of the content to the user at the first content platform; processes a set of unified cross-platform metrics for user events related to the user interacting with the subset of the content at the first content platform; and provides, to one or more additional client devices, a report of the set of unified cross-platform metrics for the user events.

Further areas of applicability of the present disclosure will become apparent from the remainder of the detailed description, the claims, and the drawings. The detailed description and specific examples are intended for illustration only and are not intended to limit the scope of the disclosure. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Figure 1A:
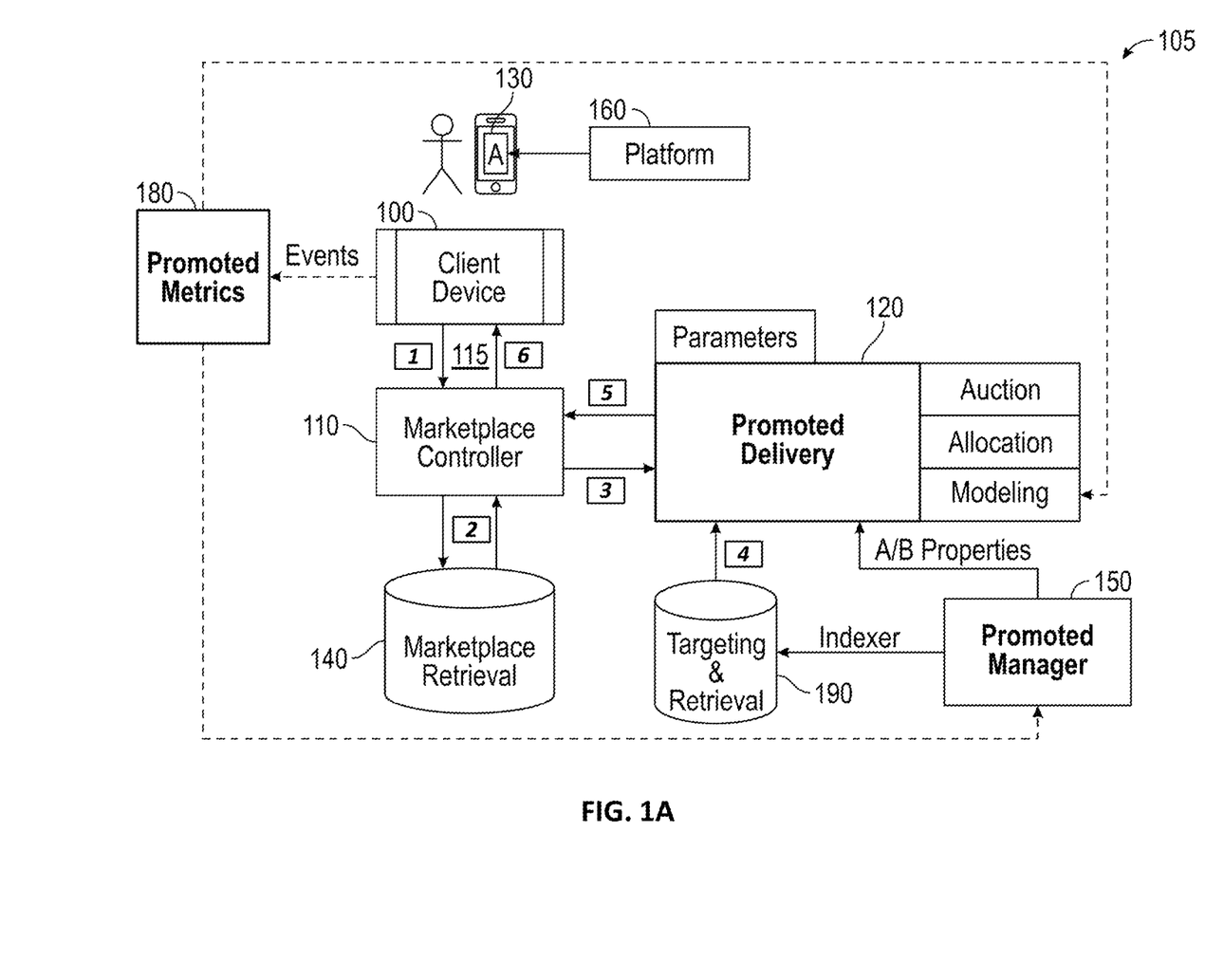
FIG. 1A is a diagram illustrating a one-step system to deliver relevant content to a user interacting with a content platform, in accordance with previous solutions and prior art.

FIG. 1A is a diagram illustrating a one-step system to deliver relevant content to a user interacting with a content platform, in accordance with previous solutions and prior art.

The diagram illustrates a one-step system 105 for delivering relevant content to a user interacting with a first content platform, i.e., platform A 130. In step 1, an application on client device 100 calls the marketplace controller 110 with a request 115 to show items to a user in a context, like a search query or home feed. Optionally, in step 2, the marketplace controller 110 can retrieve from marketplace retrieval 140 a list of items to show, including advertisements ("ads"), organic items, and promotions. Organic items are any content presented to the user that is not paid for. The marketplace controller 110 can retrieve more items than are allowed to be shown, and the items may be sorted by some quality or utility score.

In step 3, the marketplace controller 110 can send a request to delivery module 120 via a software development kit (hereinafter "SDK") or application programming interface (API). The request can ask for items to show to the user, and can include details about the user, the context, any attributes that can be used in optimization or generating a response, and the list of items retrieved in step 2, if any. The context can include user interaction with platform A 130, the user's web journey to platform A 130, user profile, or any other relevant contextual details.

Optionally, in step 4, the delivery module 120 can call a targeting and retrieval system 190 to retrieve items to show to the user or identify items as promoted. This list can extend the list obtained from step 2 and sent to delivery module 120 in step 3.

In step 5, the delivery module 120 can return the optimized allocation of items to the marketplace controller 110. In step 6, the marketplace controller 110 can return the optimized allocation obtained in step 5 to the application on client device 100 for presentation to the end user.

User events from the client device are sent to metrics module 180. The user events can include clicks, impressions, conversions, etc. The metrics module 180 can send processed metrics to managing module 150 for reporting to the delivery module 120. The managing module 150 can perform A/B testing based on the process metrics, and report the results to the delivery module 120. A/B testing lets the system change variables, such as add creative, audience, or placement to determine which placement strategy performs best and improve future campaigns. The delivery module 120 can use the process metrics to train and optimize machine learning (hereinafter "ML") models The managing module 150 can also allow the marketplace controller 110 or third parties like sellers or advertisers to manage listings by promotion or by changing attributes, potentially in per-item A/B tests. The marketplace controller 110 or third parties can send promotions to the delivery module 120 via an indexer.

An issue arises when an additional content platform, i.e., third-party platform B 160 wants to place an advertisement on platform A 130. Platform A 130 may not track all the user attributes that are relevant to platform B 160, such as the user's location. In addition, platform B 160 needs to upload all the inventory that can be shown on platform A 130, and convert the inventory to a format acceptable to platform A 130. Once platform B 160 sends all the inventory in the right format to platform A 130, platform A 130 can determine the optimal way to present the inventory to the user, without platform B 160 providing input. In addition, platform B 160 does not get detailed interaction information between the user and the presented content on platform A 130. If platform B 160 wants to present content on another platform C (not shown), platform B 160 needs to develop a separate system to interface specifically with platform C.

As a result of the drawbacks mentioned above, the presentation of information to the user is not optimized for platforms A, C. In addition, platform B 160 needs to develop custom systems for each of platforms A, C. Further, platform B 160 does not receive all interaction information from platforms A, C, even though the information is needed to make a decision on what is relevant to present.

Figure 1B:
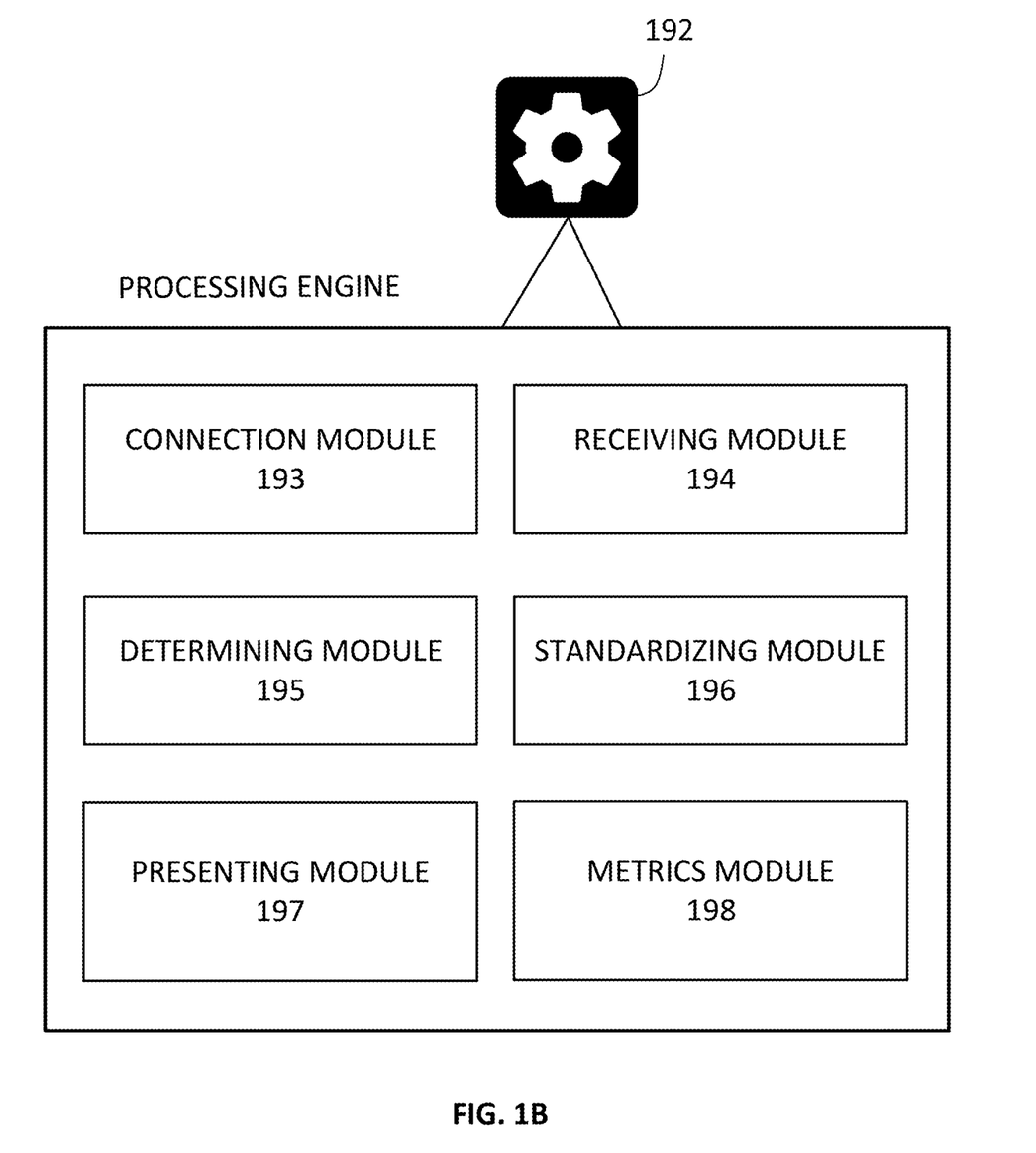
FIG. 1B is a diagram illustrating an exemplary computer system that may execute instructions to perform some of the methods herein.

FIG. 1B is a diagram illustrating an exemplary computer system that may execute instructions to perform some of the methods herein. In some embodiments, the modules illustrated are components of a processing engine 192, which may include one or more components of the present systems and methods.

Connection module 193 functions to connect a client device associated with a user to a first content platform from a set of content platforms.

Receiving module 194 functions to receive a request from the client device to present content to the user at the first content platform, and also to receive content associated with one or more of: the first content platform, and one or more additional content platforms from the set of content platforms.

Determining module 195 functions to determine a subset of the content to present to the user.

Standardizing module 196 functions to standardize the subset of the content associated with the one or more additional content platforms in a format to be used at the first content platform.

Presenting module 197 functions to present the subset of the content to the user at the first content platform.

Metrics module 198 functions to process a set of unified cross-platform metrics for user events related to the user interacting with the subset of the content at the first content platform, and also to provide, to one or more additional client devices, a report of the set of unified cross-platform metrics for the user events.

The above modules and their functions will be described in further detail in relation to the exemplary methods below, including FIG. 2C in particular.

Figure 2A:
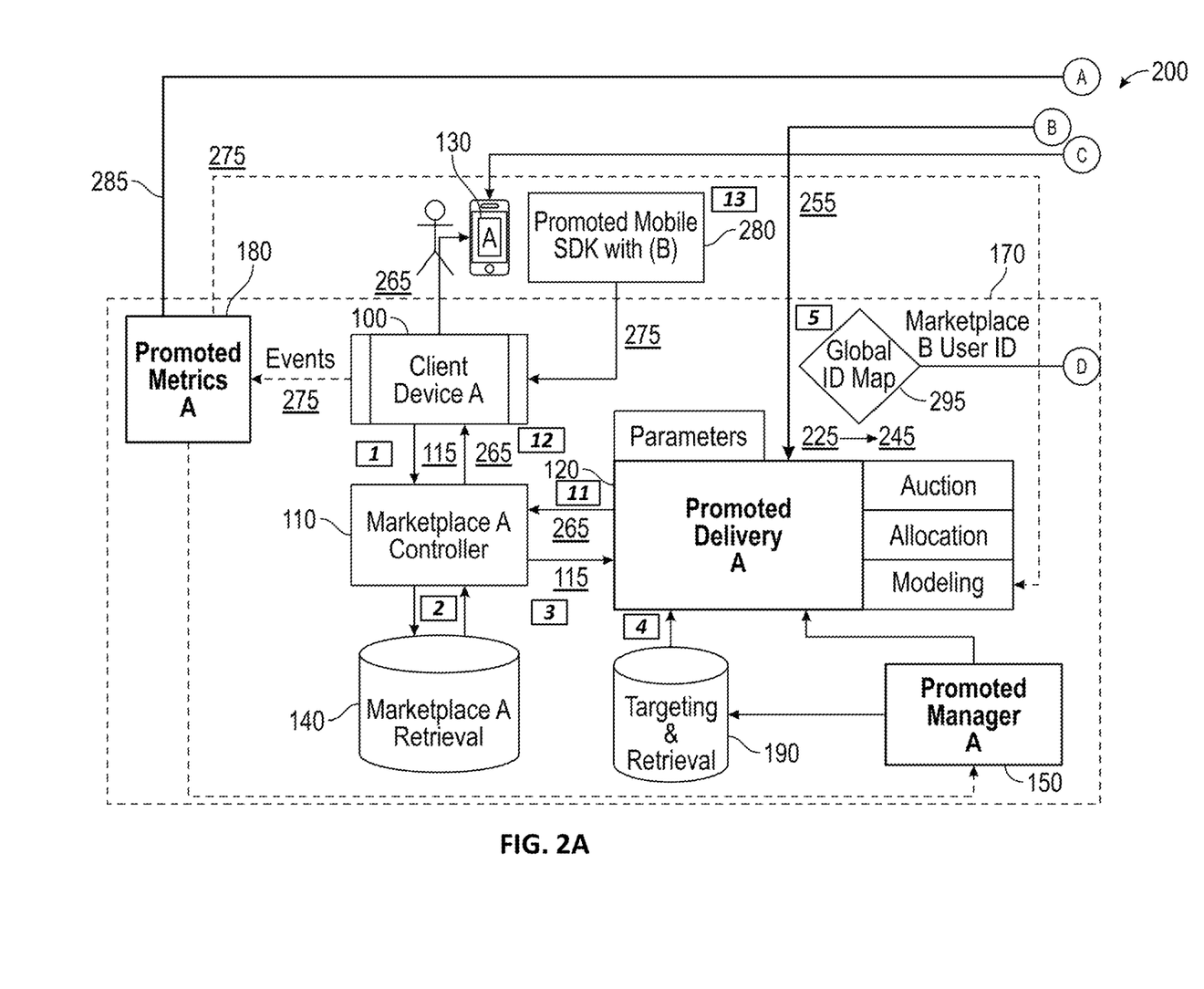
FIG. 2A is a flow chart illustrating an exemplary method that may be performed in some embodiments.
Figure 2B:
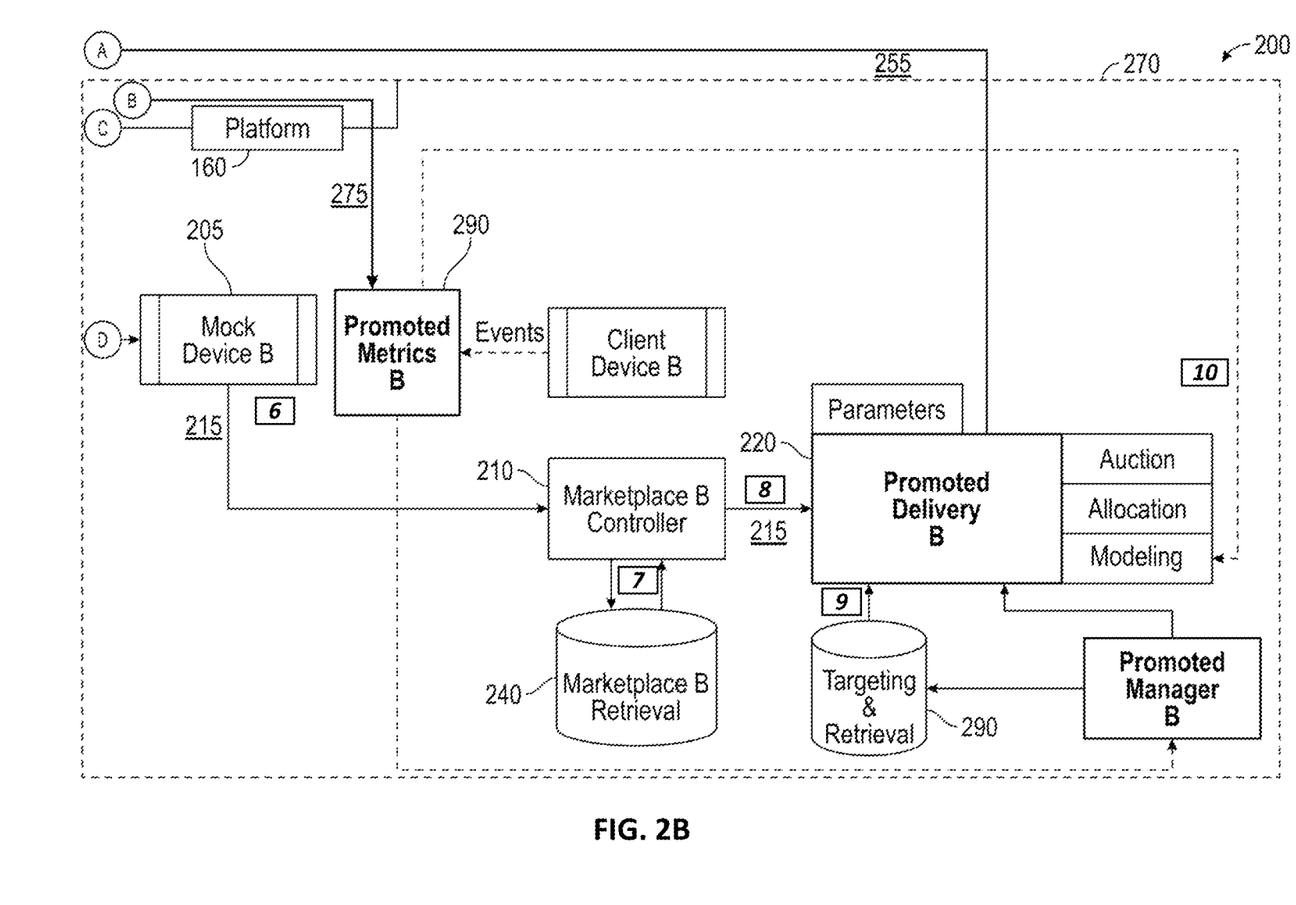
FIG. 2B is a flow chart illustrating an exemplary method that may be performed in some embodiments.

FIG. 2A is a flow chart illustrating an exemplary method that may be performed in some embodiments. FIG. 2B is a flow chart illustrating an exemplary method that may be performed in some embodiments. FIG. 2A and FIG. 2B show a two-step system to deliver relevant content from platform B 160 to a user interacting with platform A 130. The system 200 enables the backend 170 of platform A 130 to call search and discovery backend 270 belonging to platform B 160. Consequently, platform B 160 can deliver content from platform B 160 to platform A 130, as described in this application. The content can include advertisements and/or app-in-app functionality.

In step 1, an application on client device 100 calls the marketplace A controller 110 with a request 115 to show items to a user in a context, like a search query or home feed. Optionally, in step 2, the marketplace A controller 110 can retrieve from marketplace A retrieval 140 items to show, including advertisements, organic items, and promotions. Organic items are any content presented to the user that is not paid for. The marketplace A controller 110 can retrieve more items than are allowed to be shown, and the items may be sorted by some quality or utility score.

In step 3, the marketplace A controller 110 can send a request to delivery module 120 via an SDK or an API. The request can ask for items to show to the user, and can include details about the user, the context, any attributes that can be used in optimization or generating a response, and the list of items retrieved in step 2, if any. The context can include user interaction with platform A 130, the user's web journey to platform A 130, user profile, etc. The request can include information about items from all platforms A 130, B 160 in the system 200 network. The system 200 can manage permissions and merge together requests to multiple marketplace controllers 110, 210 in parallel.

Optionally, in step 4, the delivery module 120 can call a targeting and retrieval system 190 to retrieve items to show to the user or identify items as promoted. This list can extend the list obtained from step 2 and sent to delivery module 120 in step 3.

In step 5, the system 200 can use the global (identifier) ID map 295 to map a user ID 225 associated with platform A 130, to a user ID 245 associated with platform B 160. If the global ID map 295 cannot perform the mapping, the global ID map can send an anonymous request to the virtual device B 205, potentially including metadata and properties about the user request 115 from step 1. The anonymous request to the virtual device B 205 can ask the backend 270 to provide the user ID 245 associated with platform B 160.

For example, in step 5, platform A 130 can send to the system 200 a user ID 225 on platform A 130 such as an email address, a physical address, a phone number, etc. The system 200 can create or retrieve a global ID map 295 that converts the user ID 225 on platform A 130 to a user ID 245 on platform B 160. The system 200 can create the global ID map 295 based on information obtained from platform B 160, which maps global ID map 295 to the user ID 245 for platform B 160. For privacy reasons, the system 200 may not share the global ID map 295 with either platform A 130 or platform B 160.

The system 200 can simulate operation of the virtual device B 205. In step 6, the virtual device B 205 can create a request 215 similar to the request 115 from client device 100. The request 215 can be compatible with or similar to the request 115. In one embodiment, the virtual device B 205 can send the simulated request 215 to marketplace B controller 210 to fetch items. In another embodiment, if platform B 160 relies entirely on the system 200 for all retrieval in the case of providing content to platform A 130, then step 6 may not happen, and instead, the system 200 can skip to step 8, directly calling delivery module 220. If step 6 happens, optionally, in step 7, the system 200 can retrieve from marketplace B retrieval 240 items to show, including advertisements, organic items, and promotions.

In step 8, marketplace B controller 210 can call delivery module 220, similar to step 3 in FIG. 1. Optionally, in step 9, the delivery module 220 can call a targeting and retrieval system 290 to retrieve items to show to the user or identify items as promoted. This list can extend the list obtained from step 7 and sent to delivery module 220 in step 8.

In step 10, delivery modules 120, 220 can generate optimized listings using data and ML models combining what has been learned from one-step system 105 delivering content to platforms A 130, B 160 independently, and two-step system 200 delivering platform B 160 content to platform A 130. One-step system 105 can independently deliver content to platform A 130, and platform B 160, and can independently gather data from the platforms A 130, B 160. Delivery modules 120, 220 can be implemented as the same service, or can be independent services, depending on the embodiment.

In one embodiment, when delivery modules 120, 220 are independent services, the delivery module 220 can deliver to the delivery module 120 a prioritized content 255 of things to show on platform A 130. Delivery module 220 can create the prioritized content 255 based on data gathered from platform B 160. The delivery module 220 can create the prioritized content 255 using the ML model trained on user interactions observed at platform B 160. The delivery module 120 can reprioritize the prioritized content 255 using a different ML model trained on user interactions observed at platform A 130. Consequently, the delivery module 120 can deliver the reprioritized content 265 to the user on platform A 130. The delivery module A 120 can reprioritize prioritized content 255 based on various rules associated with platform A 130. For example, platform A 130 can have rules that indicate how to reprioritize the prioritized content 255. Specifically, the rules can state that platform A 130 can display only 3 items instead of 10 items, prioritized content 255 can have only advertisements, prioritized content 255 can have no advertisements, prioritized content 255 can have a mixture of advertisements, no advertisements, organic content and/or particular proportions of various content, etc.

In another embodiment, when delivery modules 120, 220 are the same service, the backends 170, 270 can know about each other. In that case, the delivery module 220 can generate the reprioritized content 265 for platform B 160 to be shown on platform A 130, using information from both platforms A and B. The ML model associated with the delivery module 220 can receive information from platform A 130, and from platform B 160. The information can be merged together. Based on the merged information, the ML model can predict the optimal prioritized contents from platform B 160 to present on platform A 130. In the case that the data does not include information about user interaction with platform B 160 content presented on platform A 130, the ML model can just use information from platform B 160. In one embodiment, the ML model can apply the rules associated with platform A 130 as described above. In another embodiment, the system 200 can apply the rules after the ML model produces the prioritized content 255.

When delivery modules 120, 220 are the same service, all the data from platform A 130 is not merged with all the data from platform B 160 to train and run the ML model. Specifically, the ML model can be trained using all of the platform B 160 data and only the data from platform A 130 describing interactions with platform B 160. That way, platform B 160 does not know all the data from platform A 130 that concerns platforms other than platform B 160. Similarly, platform A 130 only knows the data associated with platform B 160 that has been generated on platform A 130. Consequently, each platform A and B retains private data.

In step 11, delivery module 120 returns the reprioritized content 265, e.g., optimized allocation including items from both platform A 130 and platform B 160, to marketplace A controller 110. In step 12, marketplace A controller 110 returns the reprioritized content 265 to the client device 100.

In step 13, a module 280, e.g., a mobile or web client SDK, provides software, instructions, and media to client device 100 about how to display items from marketplace B backend 270. The module 280 can create app-in-app functionality for the reprioritized content 265, as explained in this application. Effectively, the module 280 enables a portion of the code associated with platform B 160 to run on a platform A 130 server. The module 280 can collect information about interaction between the user and the reprioritized content 265 associated with platform B 160, and accurately report the interactions. The reported interactions are more accurate than if platform A 130 was observing and performing the interactions and reporting to platform B 160 because the module 280 is controlled by platform B 160. Further, the module 280 can measure all the interactions that platform B 160 is interested in and that platform A 130 may not be configured to measure. The module 280 can directly send the measured interactions to platform B 160, without processing by a third party, which tends to reduce the accuracy of the reported interactions. The module 280 can send a report to platform B 160 of how many clicks, impressions, conversions, etc., were received from the module 280, broken down by different platforms A 130.

Metrics B 290 is running on platform B 160 collecting events on platform B, and metrics A 180 is running on platform A 130 collecting events 275 on platform A Events can include interactions between platform B 160 and the user such as impressions, clicks, conversions, etc. In process 285, metrics A 180 can send the events 275 to metrics B 290. The module 280 can also monitor events and send them to the client device 100, which then sends the events to metrics A 180.

For example, platform A 130 can be a home page of a content discussion platform, while platform B 160 can be a pet food store. Among the pets are cats, dogs and birds, and birds are the most popular, so by default the user gets content regarding bird food.

The content discussion platform knows that the user named Bob loves cats, because Bob is on the cat section or subsection of the platform every day, and/or the platform has Bob's user profile information indicating that Bob loves cats. The platform can upload the information about Bob's preferences for cats to backend 170. On the front page, the content discussion platform has a slot in position three, for example, and wants to show some content from the pet food store. The slot in position three can be a carousel. The backend 170 can show either a bird food ad, a dog food ad, a cat food ad, or nothing. The content discussion platform can send the request 115 to show content.

The request 115 can go to delivery module 120. The request 115 can include Bob's email address. The delivery module 120, using global ID map 295, can determine whether the email address has been seen before in any other platform. The delivery module 120 can determine that Bob's email address has been detected on platform B, the pet food store, and can determine Bob's ID 245 on that platform. If the delivery module 120 cannot identify Bob's email address, the delivery module can send an anonymous request for content to the backend 270.

Once the virtual device B 205 receives Bob's ID 245, virtual device B 205 can construct request 215 requesting content from the backend 270 associated with platform B 160. Once the delivery module 220 receives the request 215, the delivery module 220, based on the user ID 245, can determine that Bob loves dogs, not birds like everyone else. The delivery module 220 can construct prioritized content 255 containing information about dog food, advertisements about dog food, etc. When the delivery module 120 receives the prioritized content 255, the delivery module 120 knows that Bob loves cats, and adds information about cat food and leisure advertisements about cat food to the prioritized content 255 to obtain the reprioritized content 265. The reprioritized content 265 can be a combination of the dog information and the cat information, produced by the two different delivery modules 120, 220. Alternatively, the reprioritized content 265 can contain both dog information and cat information without combining them.

Figure 2C:
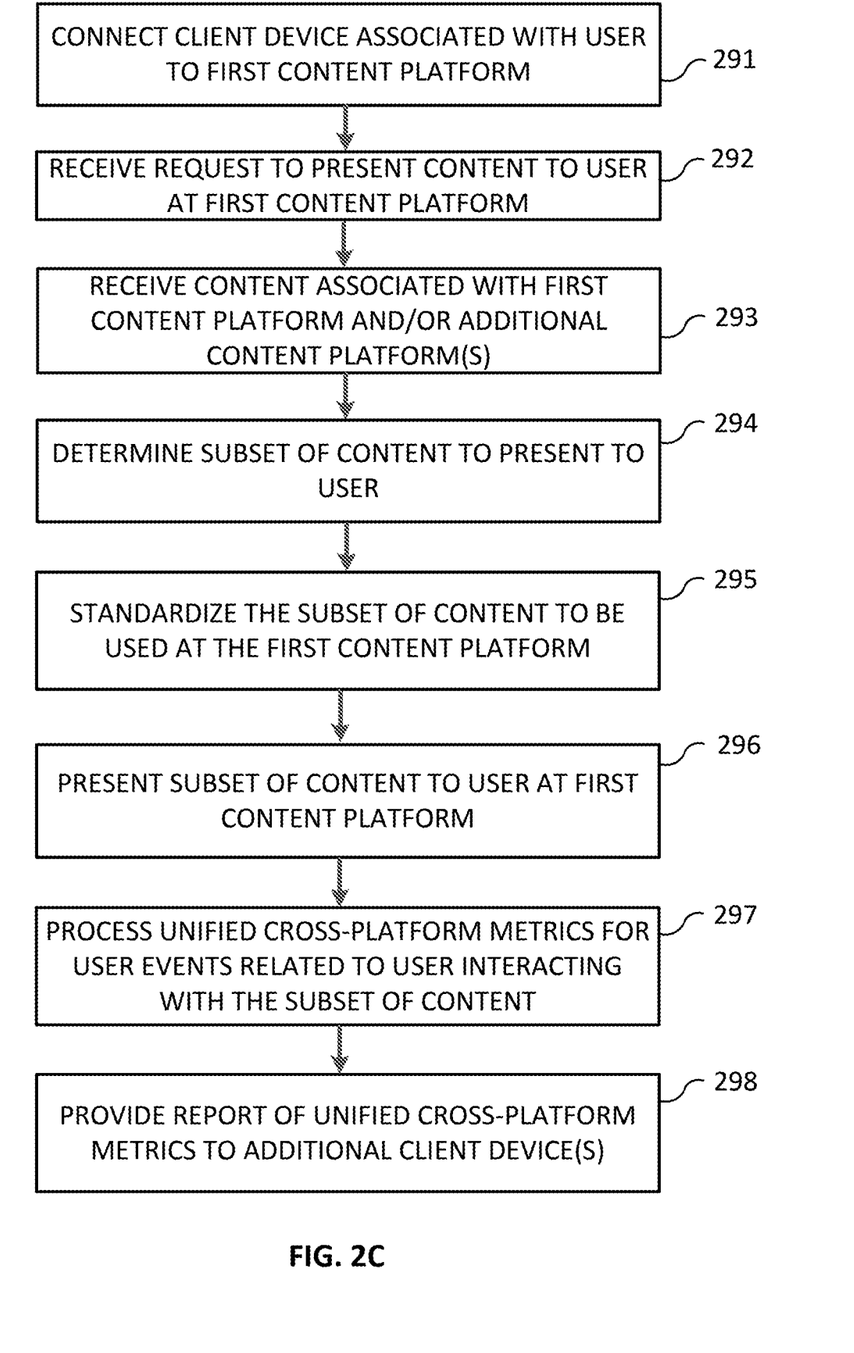
FIG. 2C is a flow chart illustrating an exemplary method that may be performed in some embodiments.

FIG. 2C is a flow chart illustrating an exemplary method that may be performed in some embodiments.

At step 291, the system connects a client device associated with a user to a first content platform from a set of content platforms. A content platform may be any web-based platform, application platform, or other platform suitable for content delivery. Such platforms may be configured to deliver, e.g., advertising and/or promotional content, organic items, options to purchase one or more products or services via e-commerce mechanisms, or any other suitable content. In some embodiments, the client device is configured to display a user interface which presents content to the user on the content platform.

At step 292, the system receives a request from the client device to present content to the user at the first content platform. In some embodiments, the request includes one or more of: user data, and contextual data. In some embodiments, the contextual data can includes one or more of a search query context, a home feed context, and/or any other relevant context for a content platform. In some embodiments, the user data can include a user profile associated with a user account of the first content platform.

At step 293, the system receives content associated with one or more of: the first content platform, and one or more additional content platforms from the set of content platforms. In some embodiments, the system retrieves, from a repository associated with the first content platform, a list of content to present to the user, where the list of content includes one or more of: advertising content, organic items, and/or promotions. In some embodiments, the system retrieves content from one or more content repositories associated with one of the additional content platforms. In various embodiments, one or more of such repositories may be cloud-based repositories.

At step 294, the system determines a subset of the content to present to the user. In some embodiments, determining the subset of content can include sorting the content by one or more of: a quality score, and a utility score. In some embodiments, determining the subset of the content to present to the user is based on one or more of: user data, contextual data, optimization attributes, item data, and/or historical data.

In some embodiments, the system determines an optimal delivery of the subset of the content across a plurality of content platforms from the set of content platforms. In some embodiments, determining the optimal delivery includes determining a minimal loss and an optimal use of one or more specified resources. In some embodiments, the one or more specified resources include one or more of spending limits and/or content impressions.

At step 295, the system standardizes the subset of the content associated with the one or more additional content platforms in a format to be used at the first content platform. In some embodiments, the standardization of the subset of the content includes enabling calling of services associated with the one or more additional content platforms from the first content platform in order to serve the subset of the content. In some embodiments, standardizing the subset of the content is performed via one or more of an SDK or an API.

In some embodiments, standardizing the subset of the content includes wrapping the subset of the content within one or more standardized software wrappers. In some embodiments, the one or more standardized software wrappers are configured to pass user data and context features between the first platform and the one or more additional platforms to enable allocation of the subset of the content based on one or more of, e.g., user identity, device, location, and/or any other suitable parameter(s) for allocation of content.

At step 296, the system presents the subset of the content to the user at the first content platform. In some embodiments, the content is displayed at the client device via a user interface containing a number of pieces of content which are arranged within various sections or subsections of the user interface for the content platform. In some embodiments, one or more interactive elements may be presented in addition to or in conjunction with the content.

At step 297, the system processes a set of unified cross-platform metrics for user events related to the user interacting with the subset of the content at the first content platform. In some embodiments, the user events can include one or more of, e.g., clicks, impressions, conversions, or any other useful or relevant user events with respect to engaging or interacting with the content on a content platform.

At step 298, the system provides, to one or more additional client devices, a report of the set of unified cross-platform metrics for the user events. In some embodiments, the system can further perform training of one or more ML models based on the unified cross-platform metrics in order to, for example, improve optimization of content delivery or predict an optimal placement of content within regions or sections of a content platform.

Figure 3:
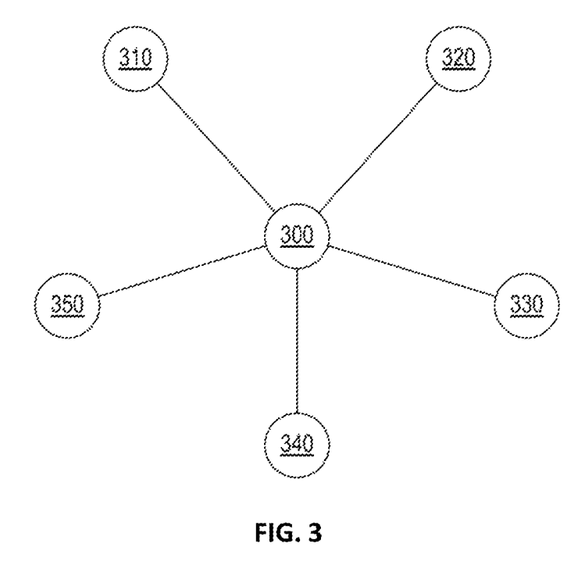
FIG. 3 is a diagram illustrating an example of connecting different content platforms in a spoke wheel configuration.

FIG. 3 is a diagram illustrating an example of connecting different content platforms in a spoke wheel configuration. The system 300 can act as a mediator between multiple platforms 310, 320, 330, 340, 350. For example, platform 310 can present content from platforms 320, 330, 340, 350 using the system 300 as a mediator. To show content from platform 320 on platform 310, the two-step system 200 in FIG. 2A and FIG. 2B can be used, with platform 310 as platform A 130, and platform 320 as platform B 160. Similarly, to show content from platform 330 and platform 310, the two-step system 200 can be used. Effectively, system 300 can combine multiple systems 200 in FIG. 2A and FIG. 2B to enable communication between multiple platforms 310, 320, 330, 340, 350. In the spoke wheel configuration, the delivery modules 120, 220 in FIGS. 2A-2B operate as independent services.

Figure 4:
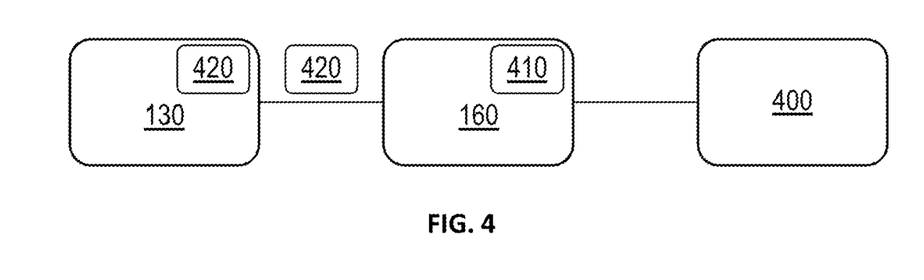
FIG. 4 is a diagram illustrating an example of connecting different content platforms in a linear chain.

FIG. 4 is a diagram illustrating an example of connecting different content platforms in a linear chain. For example, platform A 130 can be a content discussion platform, platform B 160 can be a food delivery platform, and platform 400 can be an advertising platform. The food delivery platform works with the advertising platform, and the advertising platform puts a brand advertisement 410 on the food delivery platform, for example for Pepsi. Consequently, the food delivery platform can package the content shown for its food delivery, including the brand advertisement 410 and send the package 420 to the content discussion platform. The content discussion platform can then show the package 420 on its platform, thus creating a linear chain of three links 130, 160, 400, where the platform 400 is showing its content on platform A 130.

Figure 5:
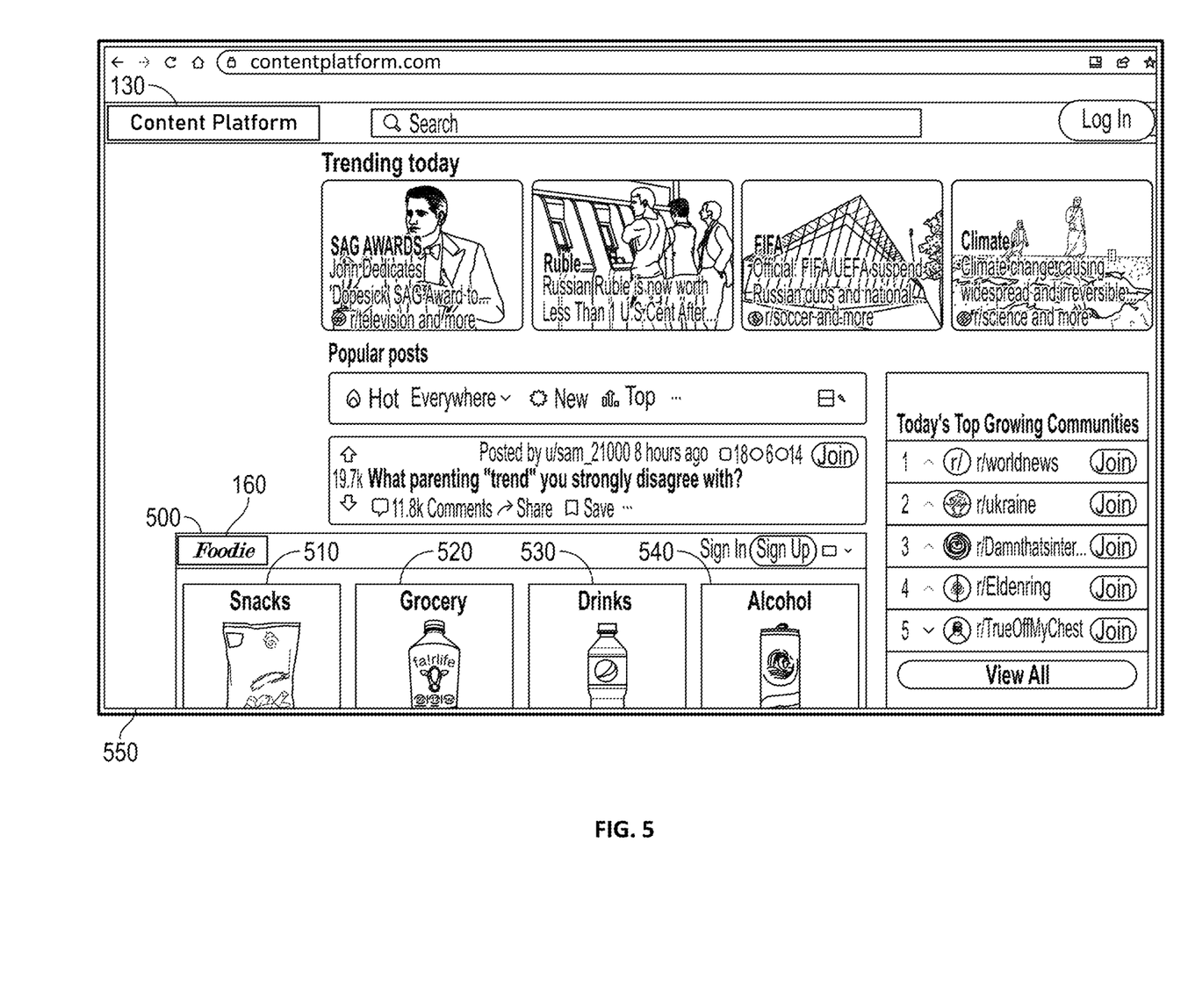
FIG. 5 is a diagram illustrating an example of content from one platform being published on another platform in accordance with some embodiments.

FIG. 5 is a diagram illustrating an example of content from one platform being published on another platform in accordance with some embodiments. The diagram shows a presentation of content 500 from platform B 160 on platform A 130. In one embodiment, platform B 160 can provide content 500 in the form of text and images to show on platform A 130. In another embodiment, platform B 160 can provide module 280 in FIG. 2A to platform A 130. Platform A 130 can run module 280 on platform A servers. The user can select any selectable graphical user interface element 510, 520, 530, 540 in the module 280. Once selected, the module 280 can make a call to platform B 160 to provide a response to the selection. The module 280 permits the user to purchase goods from a third-party vendor, namely, platform B 160, and interact with platform B 160, but still have the visual impression that the user is viewing pages served by platform A 130. Such page 550 gives the viewer of the page the impression that the user is viewing pages served by the host. Effectively, the system described in this application permits a website visitor, in a sense, to be in two places at the same.

Figure 6:
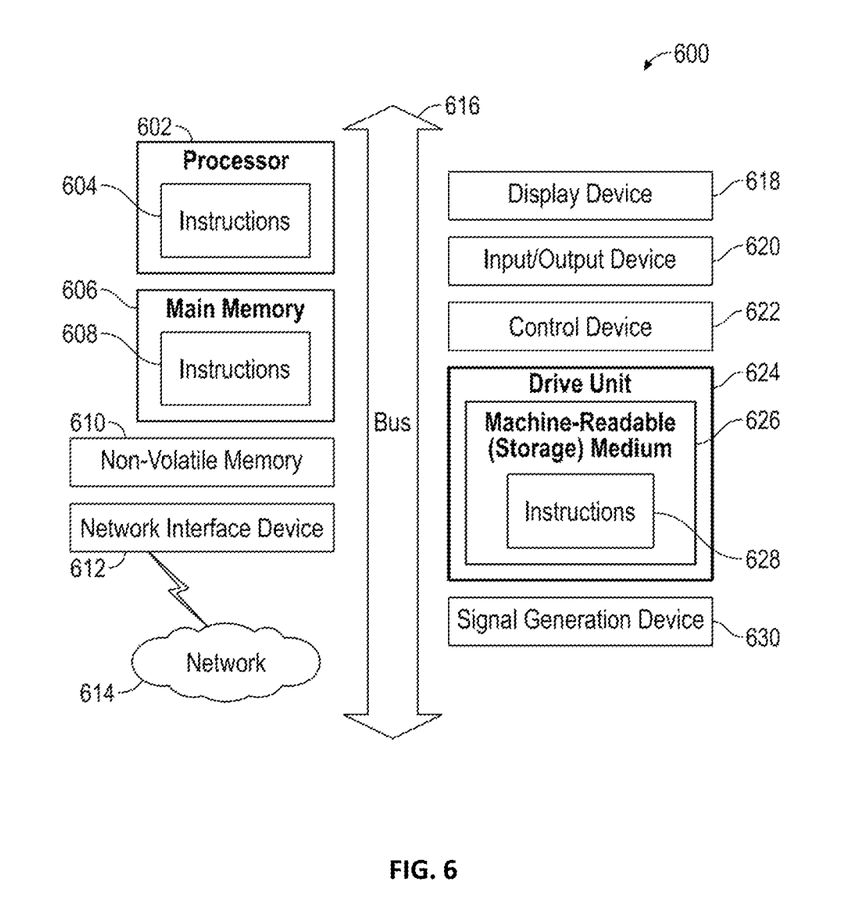
FIG. 6 is a diagram illustrating an exemplary computer that may perform processing in some embodiments.

FIG. 6 is a diagram illustrating an exemplary computer that may perform processing in some embodiments. The diagram illustrates an example of a computer system 600 in which at least some operations described herein can be implemented. As shown, the computer system 600 can include: one or more processors 602, main memory 606, non-volatile memory 610, a network interface device 612, a video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the Figures and any other components described in this specification can be implemented.

The computer system 600 can take any suitable physical form. For example, the computer system 600 can share a similar architecture as that of a server computer, personal computer (PC), tablet computer, mobile telephone, game console, music player, wearable electronic device, network-connected ("smart") device (e.g., a television or home assistant device), ARNR systems (e.g., head-mounted display), or any electronic device capable of executing a set of instructions that specify action(s) to be taken by the computer system 600. In some implementations, the computer system 600 can be an embedded computer system, a system-on-chip (SOC), a single-board computer system (SBC) or a distributed system such as a mesh of computer systems, or it can include one or more cloud components in one or more networks. Where appropriate, one or more computer systems 600 can perform operations in real time, near real time, or in batch mode.

The network interface device 612 enables the computer system 600 to mediate data in a network 614 with an entity that is external to the computer system 600 through any communication protocol supported by the computer system 600 and the external entity. Examples of the network interface device 612 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computer system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computer system 600 to perform operations to execute elements involving the various aspects of the disclosure.

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

What is claimed is:

1. A method for cross-platform content searching and presentation via a client device, comprising:
    connecting, via a first marketplace controller, the client device associated with a user to a first content platform from a set of content platforms each comprising one or more servers;
    receiving, by the first marketplace controller, a first request from the client device to present content to the user;
    receiving, by the first marketplace controller, a first subset of content from a first retrieval module, the first subset of content comprising text and images from the first content platform;
    receiving, from the first marketplace controller, a first user identifier for the user associated with the first content platform, wherein the receiving is performed by a first computing system, the first user identifier comprising an email address, a physical address or a phone number;
    determining, by the first computing system, a second user identifier by performing the operations of:
    sending, by a global identifier map module, an anonymous request for a user identifier to a simulated virtual device operating on the first computing system;
    retrieving, via the simulated virtual device, the second user identifier from the second content platform;
    sending, via the simulated virtual device, a simulated request similar to the first request to the second content platform, wherein the simulated request includes the determined second user identifier;
    based on the simulated request, retrieving via the simulated virtual device from the second content platform a second subset of content comprising text and images;
    displaying on the client device a portion of the first subset of content from the first content platform, and a portion of the second subset of content retrieved from the second content platform, wherein the client device does not send the simulated request to the second content platform;
    generating a third subset of content comprising content from the first subset of content and the second subset of content, wherein content of the third subset of content is selected by sorting the content of the first subset of content and the second subset of content by a quality score or a utility score and based at least in part on user data, contextual data or historical data;
    standardizing, via a standardizing module, the third subset of content associated with the first and second content platforms in a format of the first content platform;
    displaying, by the client device, one or more pieces of content of the third subset of content in a user interface, wherein the one or more pieces of content are arranged in sections of the first content platform;
    processing, via a metrics module, a set of unified cross-platform metrics for user events related to the user interacting with the first subset of content at the first content platform;
    providing, to one or more additional client devices, a report of the set of unified cross-platform metrics for the user events; and
    training a machine learning (ML) model based on the set of unified cross-platform metrics to predict an optimal placement of the third subset of content within regions of the first content platform;
    using the trained ML model to determine the optimal placement of the third subset of content;
    determining an optimal delivery of the third subset of content across a plurality of content platforms from the set of content platforms, wherein determining the optimal delivery comprises determining a minimal loss and an optimal use of one or more specified resources; and
    displaying, on the client device, the third subset of content based on the determined optimal placement of the third subset of content.

2. The method of claim 1, wherein the one or more specified resources comprise one or more of spending limits and/or content impressions.

3. The method of claim 1, further comprising determining the first subset of the content to present to the user based on one or more of: user data, contextual data, optimization attributes, item data, and historical data.

4. The method of claim 1, wherein the standardization of the third subset of the content comprises enabling calling of services associated with the first and second content platforms from the first content platform in order to serve the third subset of the content.

5. The method of claim 1, wherein the first request comprises one or more of: user data, and contextual data.

6. The method of claim 5, wherein the contextual data comprises one or more of a search query context and a home feed context.

7. The method of claim 5, wherein the user data comprises a user profile associated with a user account of the first content platform.

8. The method of claim 1, further comprising:
    retrieving, from a repository associated with the first content platform, a list of content to present to the user, wherein the list of content comprises one or more of: advertising content, organic items, and/or promotions.

9. The method of claim 1, further comprising: determining the first subset of content by sorting the first subset of content by one or more of: a quality score, and a utility score.

10. The method of claim 1, wherein standardizing the third subset of content is performed via one or more of a Software Development Kit (SDK) and/or an Application Programming Interface (API).

11. The method of claim 1, wherein the user events comprise one or more of: clicks, impressions, and/or conversions.

12. The method of claim 1, wherein standardizing the third subset of the content comprises wrapping the third subset of the content within one or more standardized software wrappers.

13. The method of claim 12, wherein the one or more standardized software wrappers are configured to pass user data and context features between the first platform and the second platform to enable allocation of the third subset of content based on one or more of: user identity, device, and/or location.

14. A system for cross-platform content searching and presentation via a client device, the system comprising one or more processors configured to perform the operations of:
connecting, via a first marketplace controller, the client device associated with a user to a first content platform from a set of content platforms each comprising one or more servers;
receiving, by the first marketplace controller, a first request from the client device to present content to the user;
receiving, by the first marketplace controller, a first subset of content from a first retrieval module, the first subset of content comprising text and images from the first content platform;
receiving, from the first marketplace controller, a first user identifier for the user associated with the first content platform, wherein the receiving is performed by a first computing system, the first user identifier comprising an email address, a physical address or a phone number;
determining, by the first computing system, a second user identifier by performing the operations of:
sending, by a global identifier map module, an anonymous request for a user identifier to a simulated virtual device operating on the first computing system;
retrieving, via the simulated virtual device, the second user identifier from the second content platform;
sending, via the simulated virtual device, a simulated request similar to the first request to the second content platform, wherein the simulated request includes the determined second user identifier;
based on the simulated request, retrieving via the simulated virtual device from the second content platform a second subset of content comprising text and images;
displaying on the client device a portion of the first subset of content from the first content platform, and a portion of the second subset of content retrieved from the second content platform, wherein the client device does not send the simulated request to the second content platform;
generating a third subset of content comprising content from the first subset of content and the second subset of content, wherein content of the third subset of content is selected by sorting the content of the first subset of content and the second subset of content by a quality score or a utility score and based at least in part on user data, contextual data or historical data;
standardizing, via a standardizing module, the third subset of content associated with the first and second content platforms in a format of the first content platform;
displaying, by the client device, one or more pieces of content of the third subset of content in a user interface, wherein the one or more pieces of content are arranged in sections of the first content platform;
processing, via a metrics module, a set of unified cross-platform metrics for user events related to the user interacting with the first subset of content at the first content platform;
providing, to one or more additional client devices, a report of the set of unified cross-platform metrics for the user events; and
training a machine learning (ML) model based on the set of unified cross-platform metrics to predict an optimal placement of the third subset of content within regions of the first content platform;
using the trained ML model to determine the optimal placement of the third subset of content;
determining an optimal delivery of the third subset of content across a plurality of content platforms from the set of content platforms, wherein determining the optimal delivery comprises determining a minimal loss and an optimal use of one or more specified resources; and
displaying, on the client device, the third subset of content based on the determined optimal placement of the third subset of content.

15. The system of claim 14, wherein the one or more specified resources comprise one or more of spending limits and/or content impressions.

16. The system of claim 14, wherein determining the first subset of the content to present to the user is based on one or more of: user data, contextual data, optimization attributes, item data, and historical data.

17. A non-transitory computer-readable medium containing instructions for cross-platform content searching and presentation via a client device, the instructions comprising:
connecting, via a first marketplace controller, the client device associated with a user to a first content platform from a set of content platforms each comprising one or more servers;
instructions for receiving, by the first marketplace controller, a first request from the client device to present content to the user;
instructions for receiving, by the first marketplace controller, a first subset of content from a first retrieval module, the first subset of content comprising text and images from the first content platform;
instructions for receiving, from the first marketplace controller, a first user identifier for the user associated with the first content platform, wherein the receiving is performed by a first computing system, the first user identifier comprising an email address, a physical address or a phone number;
instructions for determining, by the first computing system, a second user identifier by performing the operations of:
sending, by a global identifier map module, an anonymous request for a user identifier to a simulated virtual device operating on the first computing system;
retrieving, via the simulated virtual device, the second user identifier from the second content platform;
instructions for sending, via the simulated virtual device, a simulated request similar to the first request to the second content platform, wherein the simulated request includes the determined second user identifier;

based on the simulated request, retrieving via the simulated virtual device from the second content platform a second subset of content comprising text and images;

instructions for displaying on the client device a portion of the first subset of content from the first content platform, and a portion of the second subset of content retrieved from the second content platform, wherein the client device does not send the simulated request to the second content platform;

instructions for generating a third subset of content comprising content from the first subset of content and the second subset of content, wherein content of the third subset of content is selected by sorting the content of the first subset of content and the second subset of content by a quality score or a utility score and based at least in part on user data, contextual data or historical data;

instructions for standardizing, via a standardizing module, the third subset of content associated with the first and second content platforms in a format of the first content platform;

instructions for displaying, by the client device, one or more pieces of content of the third subset of content in a user interface, wherein the one or more pieces of content are arranged in sections of the first content platform;

instructions for processing, via a metrics module, a set of unified cross-platform metrics for user events related to the user interacting with the first subset of content at the first content platform;

instructions for providing, to one or more additional client devices, a report of the set of unified cross-platform metrics for the user events; and training a machine learning (ML) model based on the set of unified cross-platform metrics to predict an optimal placement of the third subset of content within regions of the first content platform;

instructions for using the trained ML model to determine the optimal placement of the third subset of content;

instructions for determining an optimal delivery of the third subset of content across a plurality of content platforms from the set of content platforms, wherein determining the optimal delivery comprises determining a minimal loss and an optimal use of one or more specified resources; and instructions for displaying, on the client device, the third subset of content based on the determined optimal placement of the third subset of content.

18. The method of claim 1, further comprising:

training the machine learning model based on user interactions observed at the first content platform; and using the trained machine learning model to prioritize for display to the client device the content from the first content platform and the content from the second content platform.

19. The method of claim 1, further comprising:

training the machine learning model based on user interactions observed at the second content platform; and using the trained machine learning model to prioritize for display via the client device, the content from the first content platform and the content from the second content platform.

20. The method of claim 1, further comprising:

training the machine learning model based on user interactions observed at the first content platform and user interactions observed at the second content platform; and using the trained machine learning model to prioritize for display via the client device, the content from the first content platform and the content from the second content platform.

21. The method of claim 20, further comprising:

receiving information from the first content platform and the second content platform;

merging the received information together; and based on the merged information, predicting by the trained machine learning model the prioritized content for display.

22. The method of claim 1, further comprising:

based on a plurality of rules defining the number of items for display for content from the first content platform, limiting the number of an item type of the content from the first content platform to a predefined number of an item type.

* * * * *